Aug. 22, 1939.  J. B. BAKER  2,170,492
OUTER RACEWAY MEMBER FOR ROLLER BEARINGS AND PROCESS OF MOUNTING SAME
Filed March 23, 1938  2 Sheets-Sheet 1
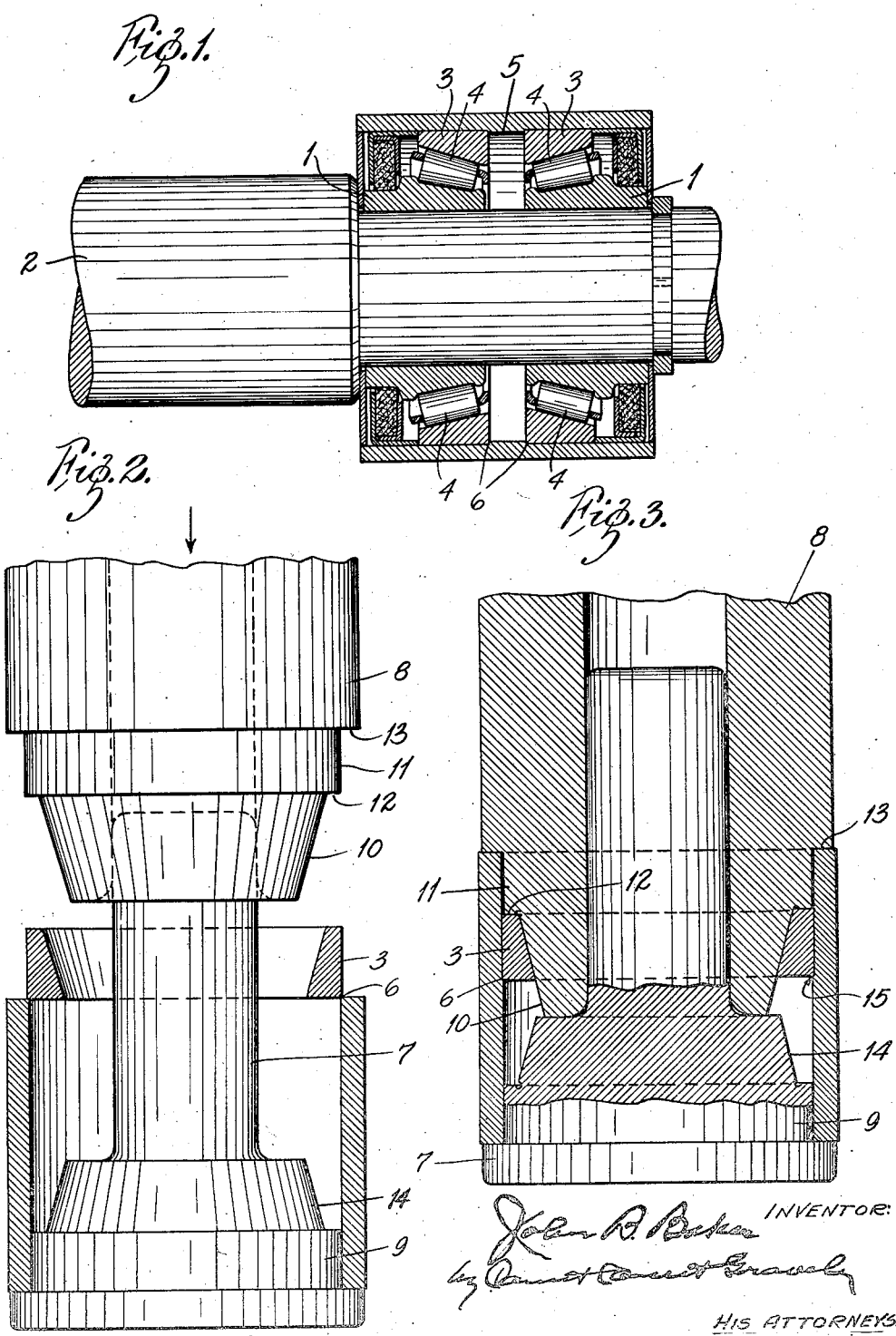

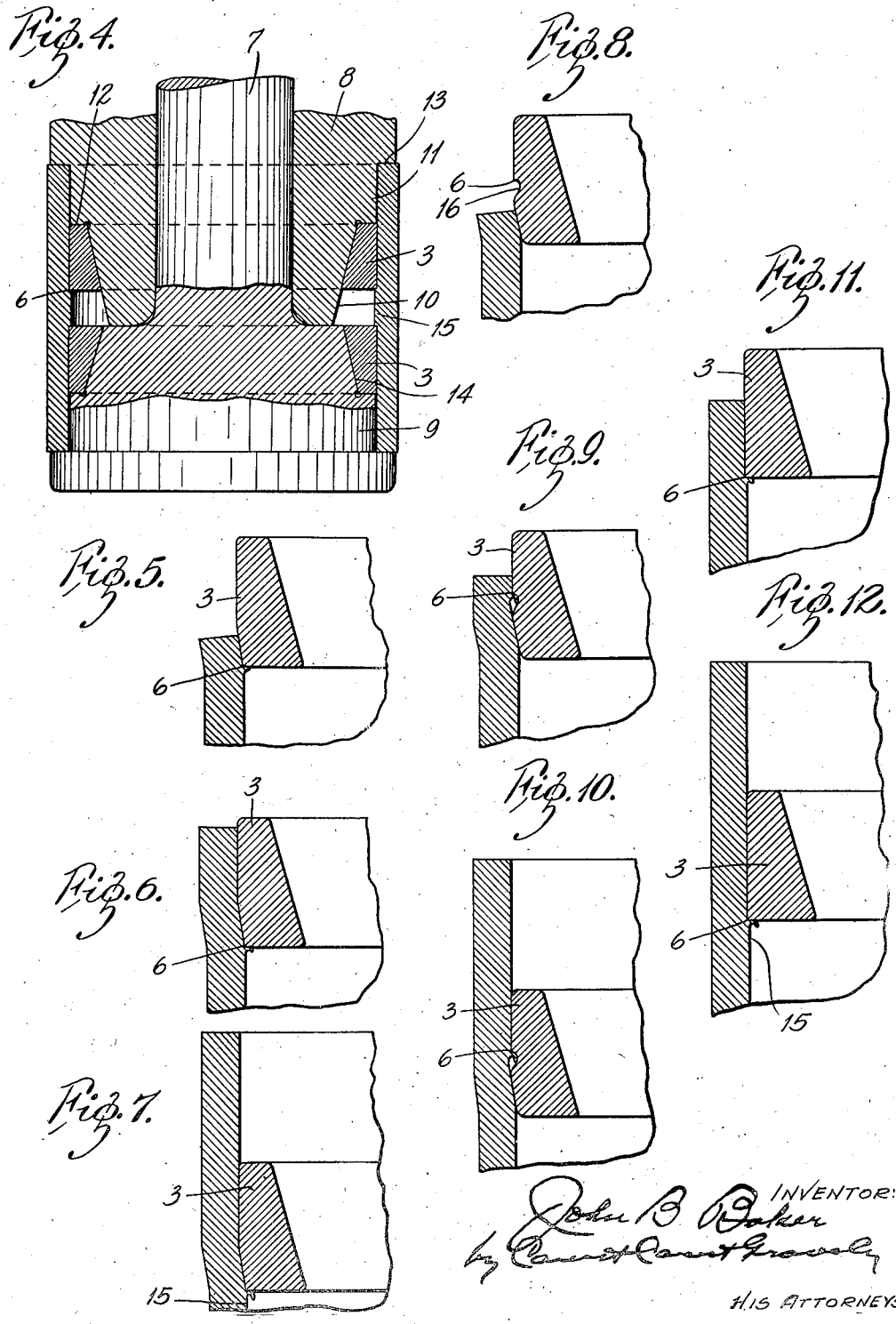

Patented Aug. 22, 1939

2,170,492

UNITED STATES PATENT OFFICE 2,170,492

OUTER RACEWAY MEMBER FOR ROLLER BEARINGS AND PROCESS OF MOUNTING SAME

John B. Baker, Canton, Ohio, assignor to The Timken Roller Bearing Company, Canton, Ohio, a corporation of Ohio Application March 23, 1938, Serial No. 197,555

10 Claims. (Cl. 29—148.4)

My invention relates to that type of roller bearing wherein the cup or outer raceway member is seated tight in a sleeve or tubular housing with its end or back face abutting against a shoulder in the bore of the sleeve. Heretofore it has been the practice to accurately machine the outer surface of the cup and to counterbore the sleeve to a precise dimension so as to form the shoulder and receive the cup with a precise fit; and likewise, the back face of the cup has been squared and finished to cooperate with the shoulder in the sleeve. These operations are expensive and, if imperfectly carried out, are liable to cause distortion or misalinement of the cup.

The principal object of this invention is to eliminate some of these operations and devise a simple and economical process of mounting a bearing cup in a sleeve and generally to overcome the disadvantages of the old method. The invention consists principally in forming a broaching edge on the periphery of the cup at the back face thereof or at some distance from the back face and also in using such cup to broach its own seat in the bore of the sleeve. It also consists in correlating the broaching edge of the cup with other portions of the surface of the cup and with the initial bore of the sleeve whereby an abutment shoulder is formed in the sleeve and the cup is press-fitted in the sleeve with a predetermined intensity of fitting stress. It also consists in the cup and in the process hereinafter described and claimed.

In the accompanying drawings which form part of this specification and wherein like reference numerals refer to like parts wherever they occur:

Fig. 1 is a longitudinal sectional view of a bearing of a tapered roller bearing assembled by my process;

Fig. 2 is a view of apparatus suitable for carrying out my process, said apparatus being shown in open position and with the sleeve and one cup shown in section in the position they occupy at the beginning of the operation;

Fig. 3 is a view of the apparatus, mainly in section, at the close of the operation of mounting the first cup in the sleeve;

Fig. 4 is a view similar to Fig. 3 with the sleeve reversed end for end and the parts shown at the end of the operation of setting the second cup;

Figs. 5, 6 and 7 are detail views of portions of the cup and sleeve in three successive stages of the mounting operation, the outer surface of the cup tapering toward the back face thereof and terminating in a cutting edge;

Figs. 8, 9 and 10 are detail views illustrating a modified form of cup and showing it in three successive stages of the mounting operation; and Figs. 11 and 12 illustrate successive stages of operation of mounting a cup whose cutting edge is of even diameter with the main outer surface thereof.

An ordinary roller bearing comprises a cone or inner raceway member 1 mounted on a shaft or axle 2, a cup or outer raceway member 3 mounted in a sleeve or housing and rollers 4 interposed between the inner and outer raceway members. The particular bearing construction illustrated in Fig. 1 represents a common type of tapered roller bearing with two series of rollers and raceway members, the cups or outer raceway members being arranged with their back faces or thick ends spaced apart by an abutment rib 5 in the bore of the sleeve, against which the back faces of the cups abut.

According to the present invention, the cup or outer raceway member 3 is formed with a peripheral cutting edge 6 to enable the cup to broach out its own seat in the sleeve. In the cup illustrated in Fig. 5, the outer surface is cylindrical throughout the greater portion of the length of the cup but tapers slightly toward the back face thereof and terminates in an angle which is sharp enough to form a cutting or broaching edge 6. The diameter of this cutting or broaching edge is somewhat larger than the initial diameter of the bore of the sleeve, and the diameter of the broaching edge is less than the diameter of the cylindrical portion of the sleeve by that amount which is required for press-fitting the cup in the sleeve with the predetermined hoop stress hereinafter mentioned.

Figs. 2, 3 and 4 illustrate an apparatus for assembling the cup in the sleeve. This apparatus comprises an anvil 7, a plunger 8 alined therewith and means (not shown) for actuating said plunger axially. The anvil 7 has an annular boss or centering guide 9 around which the end portion of the sleeve fits freely. The end portion of the plunger is tapered to form a pilot 10 around which the cup 3 is centered in alinement with said sleeve and with the thick end or back face of the cup toward the anvil. Coterminous with the pilot portion, the plunger has a cylindrical portion 11 of slightly less diameter than the initial bore of the sleeve and, at the back end of this cylindrical portion, the plunger is enlarged to form a square shoulder 12 in position to bear against the thin end of the cup. At the back end of this cylindrical portion, the plunger is further enlarged to form a second shoulder 13 which overlaps the end of the sleeve and, preferably, is so positioned that it will bear against the end of the sleeve simultaneously with the plunger reaching the limit of its stroke, as, for instance, by having its pilot end bear against the anvil. The stroke of the plunger is so adjusted as to set the cup in predetermined position in the sleeve. The apparatus shown is designed to set two cups successively in one sleeve. Accordingly, the anvil boss is provided with a tapering portion 14 to accommodate the first cup set in the sleeve when the sleeve is reversed end for end. When the sleeve is reversed, the second cup is mounted therein as in the case of the first cup.

The operation of mounting the above described cup in the sleeve is as follows: The sleeve is placed over the centering boss with its end against the anvil. The cup is placed in alinement with the sleeve in position for the pilot end of the plunger to enter and center it, the thick end of the cup being toward the anvil. The plunger is then moved forward and the shoulder thereon bears against the small end of the cup and forces the cup endwise in the sleeve as far as the stroke of the plunger will carry. As the cutting edge of the cup of Fig. 5 is of larger diameter than the initial diameter of the bore of the sleeve, the cup operates as a broach to slightly enlarge the diameter of the bore of the sleeve and at the same time form in the sleeve a low shoulder 15 in intimate contact with the back face of the cup. At the same time, hoop stress or circumferential stress is generated in the sleeve by reason of the fact that the unstressed broached bore of the sleeve is of smaller diameter than the diameter of the cylindrical portion of the cup.

Due to the fact that the tightness of the fit of the sleeve around the cup is occasioned by and is commensurate with the circumferential tension or so-called hoop stress, it is feasible to predetermine the tightness of such fit and to guard against the danger of the hoop stress exceeding the limit of elasticity of the metal of the sleeve.

With the cup illustrated in Fig. 5, one of the principal factors in the intensity of the fit is the amount by which the outside diameter of the cylindrical portion of the cup exceeds the diameter of the unstressed broached bore of the sleeve or, what amounts to the same thing, the amount by which the outside diameter of the cup exceeds the diameter of the broaching edge of the cup. A second factor is the length of the cylindrical surface of the cup, along with the conical portion where the intensity of the hoop stress is less.

Figs. 11 and 12 illustrate a modification of the cup wherein the outer surface is cylindrical from end to end and has the broaching edge at its back face. This cup broaches its own seat and forms its own abutment, but it does not involve any hoop stress of the sleeve around the cup and is, therefore, easier to dismount from the sleeve than is the case with the cup of Fig. 5.

Figs. 8, 9 and 10 illustrate another modification whereon the rear portion of the periphery of the cup tapers and the front end portion is cylindrical, the rear end of the cylindrical portion being formed with a broaching edge with a circumferential groove 16 immediately back of it, which position is forward of the cutting edge in the operation of broaching. The operation of this modification is generally similar to that of the cup of Fig. 5. However, with this modification, the initial bore of the sleeve is first enlarged and then broached, so that in the assembly, the hoop stress is limited to the portion of the sleeve rearward of the broaching edge. The circumferential groove 16 receives any chips which may be cut off by the broaching edge and keeps them away from the raceways.

My invention has a number of practical merits. Thus, it dispenses with the operation of close machining or grinding the outer surface of the cup and with the operation of grinding the front and back faces of the cup. It dispenses with the operation of close machining the inner surface of the sleeve. It makes it practicable to use thinner walled tubing for the sleeve than in the old construction, wherein the abutment shoulder had to be machined in the sleeve. As the cup broaches its own seat, it automatically eliminates, to a large extent, those conditions that tend to distort the sleeve and impair the roundness of the cup. It is noted also that the formation of the broaching edge on the cup involves practically no extra work or expense in comparison with the previous practice of radiusing the back edge of the cup. Obviously, also, my process is far more rapid and economical than the old practice of mounting the bearing cup in a sleeve.

While I have shown a particular bearing, it is to be understood that such bearing is merely typical as the use of my cup and my process are not limited to any particular type of roller bearing or to any particular design of cup or sleeve.

What I claim is:

1. The process of mounting an annular member in a sleeve with a press-fit of predetermined intensity which consists in providing said member with a broaching edge of slightly larger diameter than the initial bore of the sleeve and less than the greatest diameter of said member by such amount as is commensurate with such predetermined stress and broaching a seat for said member in said sleeve by pressing said sleeve axially into permanent position in said bore.

2. An outer raceway member for a roller bearing, said member having a circumferential groove in its outer surface, the portion of the outer surface on one side of said groove tapering toward one end of the member and the portion of said outer surface on the other side of said groove terminating in a cutting edge next to said groove.

3. An outer raceway member for a roller bearing, said member having a circumferential groove in its outer surface, the portion of the outer surface on one side of said groove tapering toward one end of the member and the portion of said outer surface on the other side of said groove being substantially cylindrical and terminating in a cutting edge next to said groove.

4. An outer raceway member for a roller bearing, said member having a raceway on its inner surface and having a cutting edge on its periphery of less diameter than the maximum diameter of the outer surface of said raceway member whereby said member is adapted to operate as a broach in the process of mounting it in a tubular housing.

5. An annular outer raceway member for a tapered roller bearing, said member having a conical raceway in the bore thereof and having the thick-end portion of its outer surface tapered and having a cutting edge at the small end of said tapered portion whereby said member is adapted for press-fitting and to operate as a broach in the process of mounting it in a tubular housing.

6. The process of mounting the outer raceway member of a roller bearing in a tubular housing whose inside diameter is initially less than the maximum diameter of said raceway member, which process consists in forming, at the periphery of said raceway member, a cutting edge whose diameter is equal to the diameter of the raceway member for a light fit and smaller for a tight fit and pressing said member with its cutting edge foremost into said housing until said cutting edge reaches a predetermined position short of the end of the housing, whereby said bearing member broaches the inner surface of said housing and forms a shoulder therein against which said raceway member abuts.

7. The process of mounting the outer raceway member of a tapered roller bearing in a tubular housing whose inside diameter is initially smaller than the maximum diameter of said raceway member, which process consists in making the thick-end portion of the raceway member of conical form and of greater diameter than the initial inside diameter of said housing and with a cutting edge at an end thereof and forcing said raceway member only part way through said housing, with its cutting edge foremost, to a predetermined position in said housing, whereby said raceway member is mounted with a press-fit with its thick end abutting against the shoulder made by the broaching operation of its cutting edge.

8. The process of mounting the outer raceway member of a bearing in a tubular housing whose inside diameter is initially smaller than the maximum diameter of said raceway member, which process consists in making one end portion of the outer surface of the raceway member of conical form and of greater diameter than the initial inside diameter of said housing and with a cutting edge at the large end of said conical portion and forcing said raceway member into position in said housing, whereby said raceway member is mounted with a tight press-fit with its end abutting against the shoulder made by the broaching operation of its sharp edge.

9. The process of mounting the outer raceway member of a bearing in a tubular housing whose inside diameter is initially smaller than the maximum diameter of said raceway member, which process consists in making the outer surface of one end portion of the raceway member of conical form and with a cutting edge and forcing said raceway member into said housing cutting edge foremost until said cutting edge reaches a predetermined position only part way through said housing, whereby said raceway member is mounted with a tight press-fit with its end abutting against the shoulder made by the broaching operation of its cutting edge.

10. The process of mounting a bearing cup in a tubular housing with a press-fit of predetermined intensity which consists in providing a housing with a bore which is initially of smaller diameter than the diameter of the bearing cup, providing the cup with a broaching edge of slightly larger diameter than the initial bore of the housing and less than the greatest diameter of the cup by such amount as is commensurate with such predetermined stress and pressing said cup axially into permanent position in said bore and thereby cutting away the wall of said bore so as to make the diameter of said bore in the unstressed condition of the housing equal to the diameter of said broaching edge.

JOHN B. BAKER.